United States Patent
Limaye et al.

(10) Patent No.: US 11,882,110 B2
(45) Date of Patent: Jan. 23, 2024

(54) RENEWAL OF SECURITY CERTIFICATES OF SUPPLICANTS

(71) Applicant: Hewlett Packard Enterprise Development LP, Houston, TX (US)

(72) Inventors: Vikram Limaye, North Sydney (AU); Jason Atkins, North Sydney (AU); Preeti Bhagavan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 12 days.

(21) Appl. No.: 17/221,050

(22) Filed: Apr. 2, 2021

(65) Prior Publication Data

US 2021/0344668 A1 Nov. 4, 2021

(51) Int. Cl.
G06F 7/04 (2006.01)
H04L 9/40 (2022.01)

(52) U.S. Cl.
CPC ........ *H04L 63/0823* (2013.01); *H04L 63/083* (2013.01); *H04L 63/0876* (2013.01)

(58) Field of Classification Search
CPC ................ H04W 12/06; H04W 12/069; H04L 63/0485; H04L 63/10; H04L 63/0823; H04L 63/083; H04L 63/0876; H04L 9/3263; H04L 9/3268
See application file for complete search history.

(56) References Cited

U.S. PATENT DOCUMENTS

| | | | |
|---|---|---|---|
| 9,130,758 B2 * | 9/2015 | Fu ....................... | H04L 63/0823 |
| 2005/0074124 A1 | 4/2005 | Thornton et al. | |
| 2006/0225129 A1 * | 10/2006 | Inoue ..................... | H04L 63/08 726/3 |
| 2011/0252230 A1 * | 10/2011 | Segre .................... | H04L 63/162 713/171 |
| 2015/0222604 A1 | 8/2015 | Ylonen | |

(Continued)

OTHER PUBLICATIONS

Ordine et al, SIP Roaming Solution Amongst Different WLAN-Based Service Providers, IEEE, Jul. 21, 2006, pp. 1-7. (Year: 2006).*

(Continued)

*Primary Examiner* — Philip J Chea
*Assistant Examiner* — Jenise E Jackson
(74) *Attorney, Agent, or Firm* — Hewlett Packard Enterprise Patent Department

(57) ABSTRACT

Examples of renewal of security certificates of supplicant devices are described. In an example, a request to authenticate a supplicant device based on a security certificate is received by an authenticator device and from a supplicant device. The request comprises information relating to the security certificate which is expired. A login history of the supplicant device and presence of a valid account associated with the supplicant device in a directory database is determined. An authentication successful message is sent to the supplicant device based on the login history and presence of the valid account in the directory database. The supplicant device is redirected to a captive web portal for authentication of the supplicant device based on the login credential. In response to a successful authentication of the supplicant device in the captive web portal, a renewed security certificate for the supplicant device is provided.

20 Claims, 5 Drawing Sheets

(56) References Cited

U.S. PATENT DOCUMENTS

| | | | | |
|---|---|---|---|---|
| 2016/0021097 | A1* | 1/2016 | Shrotri | H04L 63/0815 |
| | | | | 726/8 |
| 2016/0036794 | A1* | 2/2016 | Adhya | H04W 12/50 |
| | | | | 726/4 |
| 2016/0055490 | A1 | 2/2016 | Keren et al. | |
| 2016/0269380 | A1* | 9/2016 | Kishida | H04L 63/0272 |
| 2016/0323265 | A1* | 11/2016 | Esdaile | H04L 63/0823 |
| 2018/0070231 | A1* | 3/2018 | Barbu | H04W 12/06 |
| 2018/0183806 | A1* | 6/2018 | Nambisan | H04L 63/105 |
| 2018/0288006 | A1* | 10/2018 | Somasandharam | H04L 9/3234 |
| 2018/0309757 | A1* | 10/2018 | Schonwald | H04L 63/0884 |
| 2018/0316764 | A1* | 11/2018 | Ferreira Gomes | H04W 28/02 |
| 2019/0149532 | A1* | 5/2019 | Newberg | H04W 12/06 |
| | | | | 726/5 |
| 2022/0161876 | A1* | 5/2022 | Christensen | B62D 55/0882 |

OTHER PUBLICATIONS

Ohmori, A Case Study of Captive-Portal Detection for Web Authentication on Wired LAN in a Campus Network, IEEE, Sep. 20, 2019, pp. 1-4. (Year: 2019).*

Microsoft Docs, "Certificate Renewal—Windows Client Management", available online at <https://docs.microsoft.com/en-us/windows/client-management/mdm/certificate-renewal-windows-mdm>, Jun. 26, 2017, 6 pages.

Olenski, Julie, "What is Active Directory Certificate Services and Why Should I Use It?", Feb. 20, 2020, 6 pages.

Souppaya et al., "Securing Web Transactions TLS Server Certificate Management", NIST Special Publication 1800-16D, vol. D, Jul. 2019, 227 pages.

* cited by examiner

RENEWAL OF SECURITY CERTIFICATES OF SUPPLICANTS

BACKGROUND

A computer network includes a variety of networking devices, such as access points, controllers, gateways, switches, etc., which perform different network operations, such as network access, authentication, and routing network traffic to provide connectivity. Network access policies are implemented to manage access and privileges for devices which connect to different sections of a network. Devices can connect to the network based on their privileges and network access policies applicable to them. Thus, by implementing different network access policies and privileges, the network can be protected against unauthorized access and attacks.

Different login authentication techniques may be used to authenticate a device attempting to establish a connection with a network. Client certificate authentication is a method of authentication that uses Extensible Authentication Protocol (EAP) and Transport Layer Security (TLS), in which one of the server and the client may authenticate one another using public key certificates. This provides data encryption, server authentication, message integrity, and optional client authentication for a Transmission Control Protocol (TCP)/Internet Protocol (IP) connection.

A public key certificate also called a security certificate is issued by a certificate authority (CA) and provides identification for a device seeking to be authenticated. In client certificate authentication, generally, the web server authenticates the client using the client's X.509 certificate which is a public key certificate that conforms to a standard that is defined by X.509 Public Key Infrastructure (PKI). Client certificate authentication based on Transport Layer Security (TLS) or Secure Sockets Layer (SSL) protocols may be used by network devices, such as access points and gateways, to authenticate a device during onboarding for allowing access to a network managed by the network devices.

BRIEF DESCRIPTION OF DRAWINGS

The present disclosure, in accordance with one or more various embodiments, is described in detail with reference to the following figures. The figures are provided for purposes of illustration only and merely depict typical or example embodiments.

Figure 1:
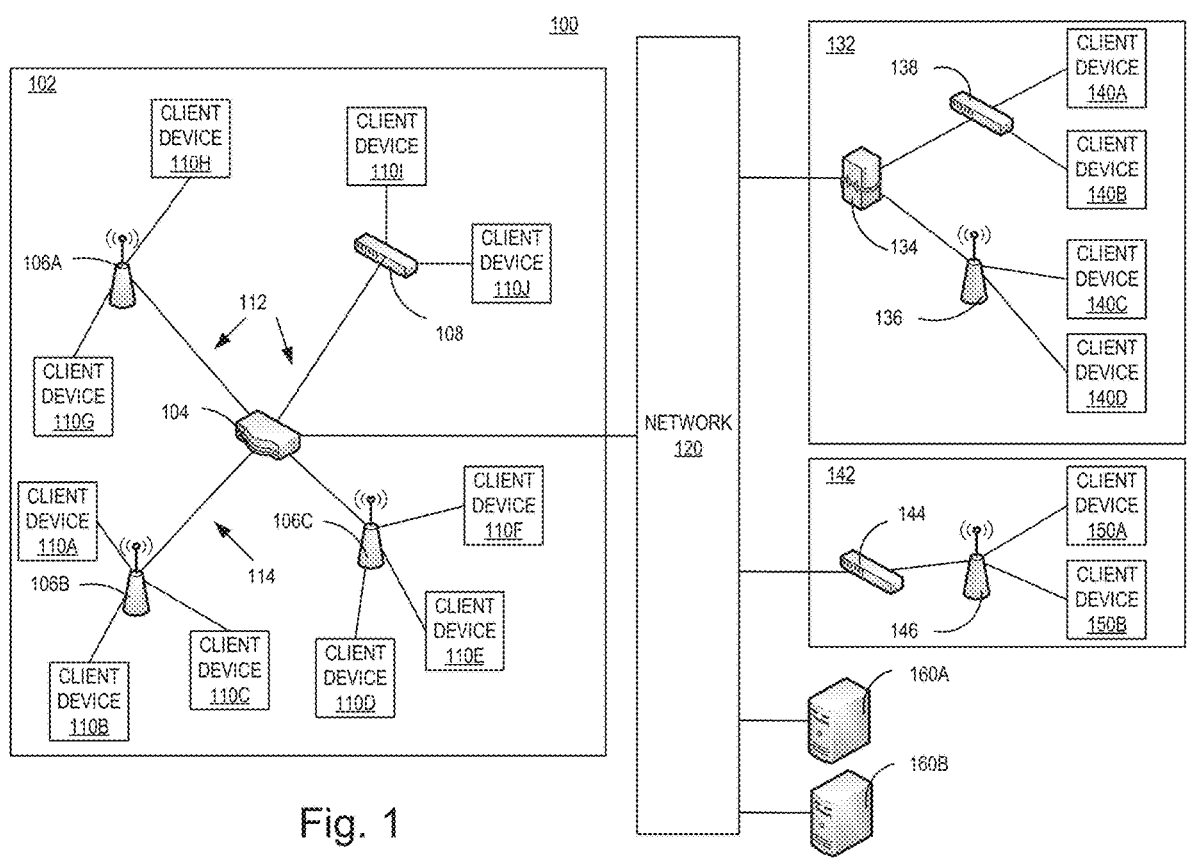
FIG. 1 illustrates an example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Network access of devices, such as computers, laptops, smartphones, and other handheld devices attempting to connect to a computer network, such as a Wireless Area Network (WAN) or a Local Area Network (LAN) are generally controlled by authentication of such devices based on certain policies. A device, such as a laptop, that seeks to connect to a computer network is called a supplicant device, Access to the computer network may be controlled based on policies which may be implemented by authenticator devices, such as controllers and access points. An authenticator device is a network device which provides a data link between a supplicant device and the network and can allow or block network traffic between the two. An authentication server generally receives and respond to requests for network access and takes decisions if network access to the supplicant device is to be allowed and various configurations/policies that should apply to the supplicant device's connection. In an example, the Authentication servers may run applications supporting the Remote Authentication Dial-In User Service (RADIUS) and Extensible Authentication Protocol (EAP) protocols. In some examples, the authentication server may be deployed in the authenticator device. In an example, the authentication server may be deployed in another network device/computer other than the authenticator device and the authenticator device may interact with the authentication server to manage network access control for supplicant devices. In some examples, a network access policy management platform may be implemented in the authenticator device for network access control.

A supplicant device seeking to be onboarded on a network, generally, logs into a captive web portal using login credentials, such as username and password, stored in a directory database. Onboarding the supplicant device in the network includes providing the supplicant device with access to the network's resources. In an example, a captive portal is a web page accessed with a web browser that is displayed to newly connected users of a Wi-Fi network before they are granted broader access to network resources. Captive portals may be used to present a landing or log-in page which may require authentication, payment, acceptance of an end-user license agreement, acceptable use policy, survey completion, or other valid credentials that both the host and user agree to adhere by. The captive portal is presented to the supplicant device and is stored either at a gateway or on a web server hosting the web page. A directory database may provide an organized set of records, often with a hierarchical structure. In an example, the directory database includes a set of processes and services. The directory database allows management and storage of information, provides authentication and authorization mechanisms, and establishes a framework to deploy other related services, such as certificate services. In an example, the Lightweight Directory Access Protocol (LDAP) may be used for accessing and maintaining distributed directory information services over an Internet Protocol (IP) network.

Once the login credentials of the supplicant device are verified in the captive web portal, the supplicant device may download a security certificate, such as a Transport Layer Security (TLS) certificate/Secure Sockets Layer (SSL) certificate. The security certificate is a digital file through which the identity and authentication of a supplicant device connecting to the network is established. The security certificate may be provided to the supplicant device by the authenticator device, by an authentication server or any other third party, such as a certificate authority. In an example, the security certificate includes information about the identity of the supplicant device, and a digital signature of an entity, such as the certificate authority, that has verified the contents of the security certificate. In an example, the security certificate is a X.509 compliant public key certificate. For subsequent logins of the supplicant device in the network, the supplicant device may employ, client certificate authentication, such as an EAP or TLS-based authentication, using the security certificate.

The security certificate expires after a certain period of time. Generally, automatic emails and reminders are sent to the supplicant device when its security certificate is about to expire. However, the users of the supplicant device may tend to ignore the email alerts. If the security certificate is expired and the supplicant device tries to access the network on the basis of the expired security certificate, generally, authentication of the supplicant device fails and an authentication failure message is sent to the supplicant device. In such a scenario, a user of the supplicant device logs a ticket with an IT support team. A network administrator from the IT support team generally downloads a renewed version of the security certificate and installs the same which can subsequently be used for TLS-based authentication. This may result in interruption in network access and loss of connectivity for the supplicant device.

Further, once there is a failure in authentication of the supplicant device, the supplicant device may periodically reattempt authentication based on its settings. After a certain number of failed attempts, user account corresponding to the supplicant device may get locked. In such an event, in addition to downloading and installing the renewed security certificate, the user account also needs to be unlocked. This may result in increased downtime due to restricted access to the network for the supplicant device and higher manual effort for the support team to unlock the account.

The present disclosure relates to renewal of security certificate based on checks performed by the authenticator device, which may facilitate in reducing manual effort of the IT support teams, may provide uninterrupted network access to the supplicant device, and reduce downtime for the supplicant device. According to the present disclosure, when a supplicant device attempts to access a network managed by an authenticator device, the supplicant device sends a request to the authenticator device for authentication of the supplicant device based on a security certificate of the supplicant device. The request includes information relating to the security certificate which is expired. In an example, the request may be a request for client certificate authentication, such as an EAP or SSL/TLS-based authentication of the supplicant device. The information may be a security certificate number, a public key associated with the security certificate, and an expiration date of the security certificate. On receiving the request, the authenticator device determines a login history of the supplicant device and/or existence of a valid account associated with the supplicant device in a directory database. The valid account refers to a user account having rights and privileges to connect to the network managed by the authenticator device.

The valid account has a login credential, such as a username and a password which may be used for Hyper Text Transfer Protocol Secure (HTTPS) basic authentication of the supplicant device. In an example, the directory database may store information relating to the valid account associated with the supplicant device as an entry including a username, a password, a Media Access Control (MAC) address of the supplicant device, and information of a security certificate of the supplicant device. Based on the checked login history and on determining that the valid account associated with the supplicant device is present in the directory database, an authentication successful message is sent to the supplicant device. The authentication successful message is indicative of the supplicant device being successfully recognized by the authenticator device, although, access to the network resources managed by the authenticator device may be limited.

Further, the supplicant device is redirected to a captive web portal for authentication of the login credential of the supplicant device. In an example, the login credential includes a username and a password of the valid account associated with the supplicant device, where the username and password may be used for HTTPS basic authentication of the supplicant device in the captive web portal. In response to successful authentication of the supplicant device in the captive web portal, a renewed security certificate for the supplicant device is provided. The renewed security certificate may be used by the supplicant device for subsequently logging in into the network managed by the authenticator device based on TLS-based authentication.

Thus, an expired security certificate of the supplicant device attempting to access a network is automatically renewed based on checks of login history and existence of a valid account in the directory database, consequently reducing/eliminating manual intervention from a user or network administrator. Additionally, since the security certificate is renewed during the process of onboarding, chances of the supplicant device getting locked out due to multiple failed attempts to access the network may be reduced. Thus, uninterrupted network access may be provided to the supplicant device without compromising on network security, even when a security certificate of the supplicant device has currently expired.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

The controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like. Client devices may also be referred to as stations (STA) or supplicant devices.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. Therefore, the switch 108 may control network access of the client devices 110i-j and may authenticate the client devices 110i-j for connecting to the switch 108 and through the switch 108, to other devices within the network configuration 100. Thus, the switch 108 may act as an authenticator device. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. The APs 106a-c may control network access of the client devices 110a-h and may authenticate the client devices 110a-h for connecting to the APs and through the APs, to other devices within the network configuration 100. Thus, the APs 106a-c may act as authenticator devices, Each of APs 106a-c may be a combination of hardware, software, and/or firmware that is configured to provide wireless network connectivity to wireless client devices 110a-h. In the illustrated example, APs 106a-c can be managed and configured by the controller 104, APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a-j, 140a-d, 150a-b may request and access the multimedia content provided by the content servers 160a-b.

Figure 2:
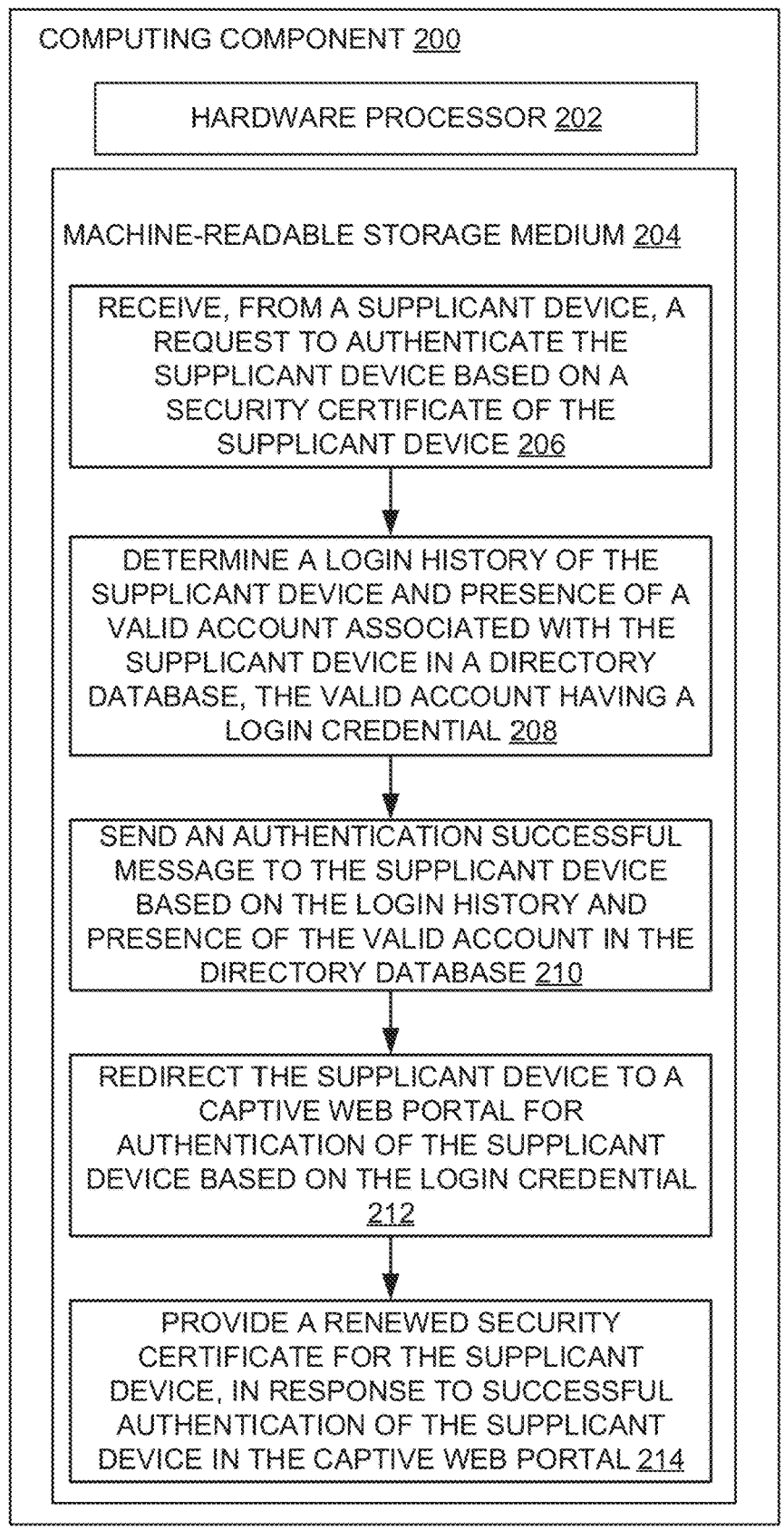
FIG. 2 is a block diagram of an example computing component or device for renewal of security certificates in accordance with an embodiment.

FIG. 2 is a block diagram of an example computing component or device for renewal of a security certificate in accordance with an embodiment. In an example, the computing component 200 may function as an authenticator device, as referred to in embodiments described herein. Computing component 200 may be, for example, an access point, a server computer, a controller, or any other similar computing component capable of processing data. In the example implementation of FIG. 2, the computing component 200 includes a hardware processor, 202, and machine-readable storage medium, 204. In some embodiments, computing component 200 may be an AP, such as, wireless APs 106a-c, 136, or 146 of FIG. 1, a gateway, such as gateways 134 and 144 of FIG. 1, a controller, such as, the controller 104 of FIG. 1 or a component of network 120 of FIG. 1.

Hardware processor 202 may be one or more central processing units (CPUs), semiconductor-based microprocessors, and/or other hardware devices suitable for retrieval and execution of instructions stored in machine-readable storage medium, 204. Hardware processor 202 may fetch, decode, and execute instructions, such as instructions 206-214, to control processes or operations for renewal of security certificate. As an alternative or in addition to retrieving and executing instructions, hardware processor 202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 204, may be any electronic, magnetic, optical, or other physical storage device that contains or stores executable instructions. Thus, machine-readable storage medium 204 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 204 may be a non-transitory storage medium, where the term "non-transitory" does not encompass transitory propagating signals. As described in detail below, machine-readable storage medium 204 may be encoded with executable instructions, for example, instructions 206-214.

Further, although the steps shown in FIG. 2 are in an order, the shown order is not the only order in which the steps may be performed. Any step may be performed in any order, at any time, may be performed repeatedly, and/or may be performed by any suitable device or devices. The process shown in FIG. 2 is also discussed in FIGS. 3A and 3B, at a differing level of detail.

In step 206, a request from a supplicant device is received. In an example, the supplicant device may be a client device, such as one of client devices 110a-j, 140a-d, or 150a-b. The supplicant device seeks for authentication by the authenticator device, i.e., the computing component 200, for accessing a network, such as the network 102 or 120 of FIG. 1. The request is for authentication of the supplicant device based on a security certificate of the supplicant device. The request includes information relating to the security certificate. The information may include a digital signature of a certificate authority issuing the security certificate and an expiration date of the security certificate. Consider that the security certificate of the supplicant device is expired.

In step 208, a login history of the supplicant device is determined. Further, it is also determined whether a valid account associated with the supplicant device is present in a directory database. In an example, the directory database may be provided as a service by servers, such as content servers 160a-b of FIG. 1. In an example, the valid account may be an active user account in a client device, such as the client devices 110a-j, having a login credential, such as a username and password. In an example, the login history includes information relating to previous successful and failed login attempts of the supplicant device. The login history may be stored in the computing component 200. In an example, the computing component 200 may interact with a server or controller, such as content servers 160a-b or controller 104, respectively, of FIG. 1, to obtain the login history.

In step 210, an authentication successful message is sent to the supplicant device based on the login history and presence of the valid account in the directory database. The authentication successful message is indicative of the supplicant device being successfully recognized by the authenticator device. At this stage, after the authentication successful message is sent to the supplicant device, the supplicant device may have a limited access to the network resources managed by the authenticator device.

In step 212, the supplicant device is redirected to a captive web portal for authentication of the supplicant device based on the login credential. In an example, the captive web portal is provided by a server, such as the content servers 160a-b of FIG. 1. The authentication in the captive web portal may be a HTTPS basic authentication based on the login credential of the valid account associated with the supplicant device. In an example, the suppliant device may be redirected to the captive web portal based on one of a predefined role, a vendor specific attribute, and a redirect URL. In an example, an external RADIUS server may authenticate network users/supplicant devices and return to the authenticator device, a vendor-specific attribute (VSA) that contains the name of the predefined role for the user of the supplicant device. The authenticated user is placed into the predefined Role specified by the VSA.

In response to successful authentication of the supplicant device in the captive web portal a renewed security certificate for the supplicant device is provided, in step 214. In an example, the renewed security certificate may be sent to the supplicant device. In another example, a Uniform Resource Locator (URL) for the renewed security certificate to be downloaded by the supplicant device may be generated and the URL may be sent to the supplicant device. In an example, the URL may point to a location in a server, such as content servers 160a-b, which may store the renewed security certificate. A user of the supplicant device may download the renewed security certificate from the URL and install the renewed security certificate which may be used by the supplicant device for subsequent logins into the network through client certificate authentication. Thus, the authenticator device enables a supplicant device with an expired security certificate to renew its security certificate with reduced manual intervention, consequently ensuring uninterrupted network access and higher connectivity.

Figure 3A:
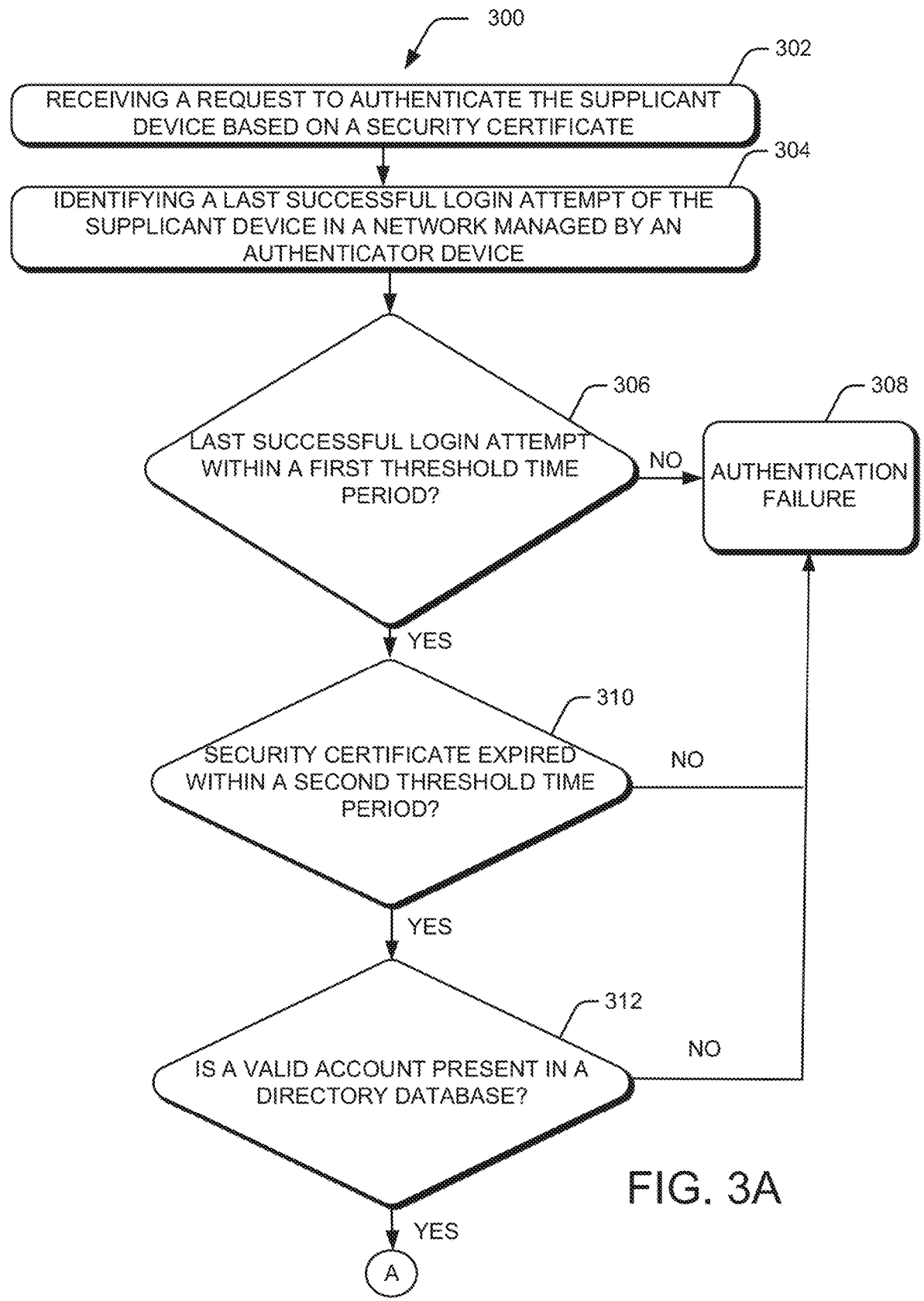
FIGS. 3A and 3B illustrate an example method for renewal of security certificates in accordance with an embodiment.
Figure 3B:
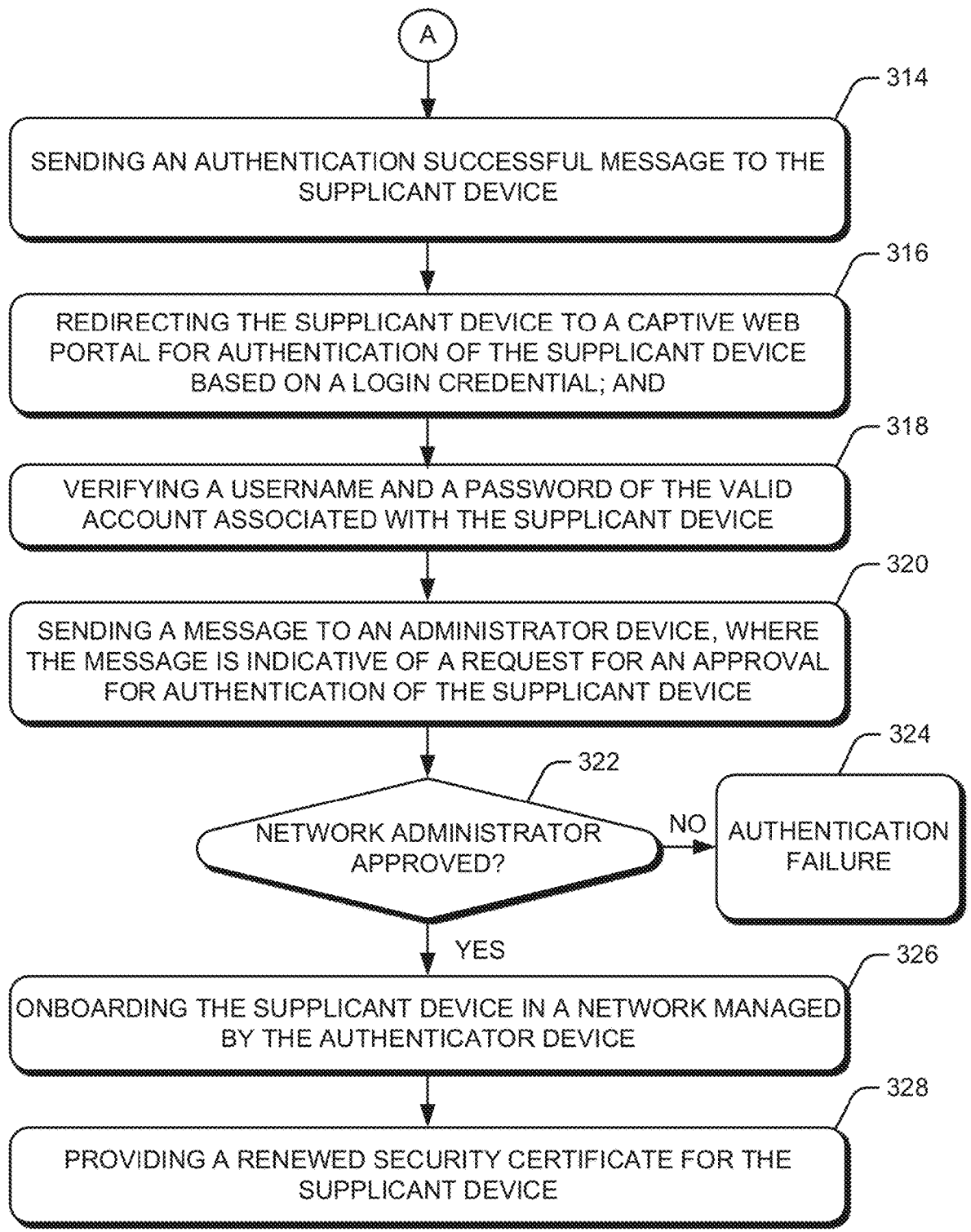

FIGS. 3A and 3B illustrate an example method 300 for renewal of security certificates in accordance with an embodiment. The method 300 may be executed by an authenticator device, such as an AP 106a-c or a controller 104 of FIG. 1. The method 300 can be implemented by processing resource(s) or computing device(s) through any suitable hardware, a non-transitory machine readable medium, or combination thereof. In an example, the method 300 may be performed by computer-readable instructions, which include instructions stored on a medium and executable by a processing resource, such as the hardware processor 202, of a computing component, such as the computing component 200. Further, although the method 300 is described in context of the aforementioned computing component 200, other suitable systems may be used for execution of the method 300. It may be understood that processes involved in the method 300 can be executed based on instructions stored in a non-transitory computer-readable medium. The non-transitory computer-readable medium may include, for example, digital memories, magnetic storage media, such as a magnetic disks and magnetic tapes, hard drives, or optically readable digital data storage media.

Referring to FIG. 3A, at block 302, a request to authenticate a supplicant device, such as a client device 110a-j of FIG. 1, is received by the authenticator device, such as an AP 106a-c or a controller 104 of FIG. 1 or the computing component 200 of FIG. 2. In an example, the request is for EAP and/or TLS-based authentication of the supplicant device based on its security certificate which has expired. The request includes information relating to the security certificate. In an example, on receiving the request, the authenticator device may analyze the information relating to the security certificate to determine that the security certificate has expired. In an example, a digital signature of a certificate authority embedded in the security certificate may be checked to determine the expiration of the security certificate.

At block 304, a last successful login attempt of the supplicant device in a network, such as the network 102 or 120 of FIG. 1, managed by the authenticator device is identified. In an example, a login history of the supplicant device may be stored in the authenticator device or may be accessed by the authenticator device from an AP controller, such as the controller 104 of FIG. 1. From the login history, the last successful login attempt of the supplicant device may be identified. In an example, the last successful login attempt is a most recent attempt of the supplicant device which was allowed by the authenticator device based on client certificate authentication of the security certificate of the supplicant device.

At block 306, it is determined whether the last successful login attempt was within a first threshold time period. In an example the first threshold time period may be a predefined timespan counted backwards from a time instance of the request. In an example, the first threshold time period may be predefined as one day from the time instance of the request.

In response to determining that the last successful login attempt was not within the first threshold time period ('No' branch from block 306), an authentication failure message is sent to the supplicant device, at block 308. In an example, the authentication failure message is indicative of the supplicant device's identity not being recognized by the authenticator device. In response to determining that the last successful login attempt was within the first threshold time period ('Yes' branch from block 306), it is determined whether the security certificate has expired within a second threshold time period, at block 310. In an example, the second threshold time period may be a predefined timespan counted backwards from a time instant of the request. In an example, the second threshold time period is one of equal to and less than the first threshold time period.

In response to determining that the security certificate has expired at a time instant beyond the second threshold time period ('No' branch from block 310), the authentication failure message is sent to the supplicant device, as shown at block 308. In response to determining that the security certificate has expired within the second threshold time period ('Yes' branch from block 310), presence of a valid account associated with the supplicant device in a directory database is checked, at block 312. In response to a determination that the valid account is absent in the directory database ('No' branch from block 312), the authentication failure message is sent to the supplicant device, as shown at block 308.

In response to a determination that the valid account is present in the directory database ('Yes' branch from block 312), an authentication successful message is sent to the supplicant device, at block 314. The authentication successful message is indicative of the supplicant device being successfully recognized by the authenticator device. Thus, based on the login history and presence of the valid account in the directory database, the authentication successful message is sent to the supplicant device. In an example, the authentication successful message is sent to the supplicant device in response to a determination that the last successful login attempt was within the first threshold time period, the security certificate has expired within the second threshold time period, and the valid account associated with the supplicant device is present in the directory database ('Yes' branches from blocks 306, 310, and 312).

At block 316, the supplicant device is redirected to a captive web portal for authentication of the supplicant device based on the login credential of the valid account associated with the supplicant device. In an example, a redirect URL may be sent to the supplicant device along with the authentication successful message. A user of the supplicant device may click on the redirect URL to redirect the supplicant device to the captive web portal. In the captive web portal, a username and a password of the valid account associated with the supplicant device is verified, at block 318.

In response to a successful authentication of the supplicant device in the captive web portal, a message is sent to an administrator device, at block 320. The message is indicative of a request for an approval for authentication of the supplicant device. The administrator device is a computing resource monitored by a network administrator. The message may be displayed in the administrator device requesting for an input from the network administrator for sponsoring or endorsing the supplicant device. Sponsorship/endorsement from the network administrator indicates an approval obtained from the network administrator, at block 322, about the authenticity and identity of the supplicant device. If the approval is not received from the network administrator ('No' branch from block 322), an authentication failure message is sent to the supplicant device at block 324. On receiving the message requesting for the approval, the network administrator may deny the request for approval for authentication of the supplicant device. The network administrator, in an example, may provide an input in the administrator device to deny the request for approval. In a scenario, where the network administrator denies the approval, the security certificate of the supplicant device may be marked as being revoked by the network administrator. Such a supplicant device with a revoked security certificate shall be denied access to network resources managed by the authenticator device.

In response to receiving the approval from the administrator device ('Yes' branch from block 322), the supplicant device is onboarded in a network managed by the authenticator device at block 326. Thus, in an example, successful authentication of the supplicant device in the captive web portal may be dependent on the sponsorship/approval obtained from the network administrator about the identity of the supplicant device.

In response to a successful authentication of the supplicant device in the captive web portal, in an example, a Uniform Resource Locator (URL) for a renewed security certificate to be downloaded by the supplicant device may be generated. In an example, the URL points to a location where the renewed security certificate is stored and the URL is sent to the supplicant device. In an example, the renewed security certificate may be downloaded from the URL and installed in the supplicant device. In an example, the renewed security certificate may be sent to the supplicant device, Thus, the renewed security certificate is provided to the supplicant device, at block 328. The supplicant device may use the renewed security certificate for client certificate authentication to subsequently login to the network managed by the authenticator device.

Thus, the security certificate of the supplicant device may be renewed with reduced manual intervention consequently improving network access of the supplicant device even when the supplicant device attempts to connect to the network with an expired security certificate. Further, multiple failed authentication attempts of the supplicant device with an expired security certificate may be reduced/eliminated, consequently reducing the otherwise existent possibility of the account of the supplicant device getting locked out due to those multiple failed authentication attempts.

Figure 4:
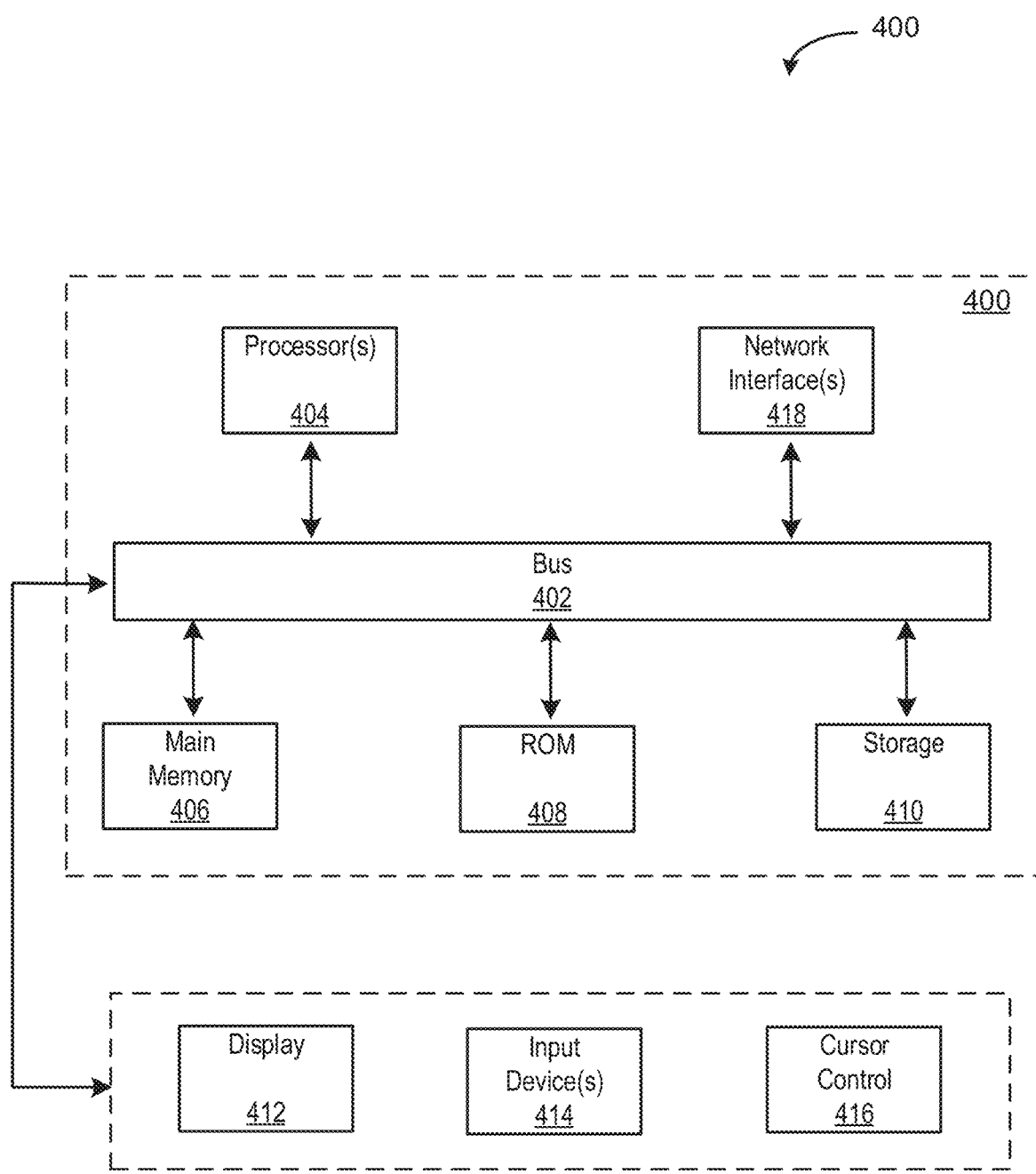
FIG. 4 depicts a block diagram of an example computer system in which the embodiments described herein may be implemented.

FIG. 4 depicts a block diagram of an example computer system 400 in which the embodiments described herein may be implemented. The computer system 400 includes a bus 402 or other communication mechanism for communicating information, one or more hardware processors 404 coupled with bus 402 for processing information. Hardware processor(s) 404 may be, for example, one or more general purpose microprocessors.

The computer system 400 also includes a main memory 406, such as a random access memory (RAM), cache and/or other dynamic storage devices, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

The computer system 400 further includes a read only memory (ROM) 408 or other static storage device coupled to bus 402 for storing static information and instructions for processor 404. A storage device 410, such as a magnetic disk, optical disk, or USB thumb drive (Flash drive), etc., is provided and coupled to bus 402 for storing information and instructions.

The computer system 400 may be coupled via bus 402 to a display 412, such as a liquid crystal display (LCD) (or touch screen), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. In some embodiments, the same direction information and command selections as cursor control may be implemented via receiving touches on a touch screen without a cursor.

The computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor(s) 404 executing one or more sequences of one or more instructions contained in main memory 406. Such instructions may be read into main memory 406 from another storage medium, such as storage device 410. Execution of the sequences of instructions contained in main memory 406 causes processor(s) 404 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 410. Volatile media includes dynamic memory, such as main memory 406. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 402. Transmission media can also take the form of acoustic or light waves, such as those generated during radio-wave and infra-red data communications.

The computer system 400 also includes a communication interface 418 coupled to bus 402. Network interface 418 provides a two-way data communication coupling to one or more network links that are connected to one or more local networks. For example, communication interface 418 may be an integrated services digital network (ISDN) card, cable modem, satellite modem, or a modem to provide a data communication connection to a corresponding type of telephone line. As another example, network interface 418 may be a local area network (LAN) card to provide a data communication connection to a compatible LAN (or WAN component to communicated with a WAN). Wireless links may also be implemented. In any such implementation, network interface 418 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 418, which carry the digital data to and from computer system 400, are example forms of transmission media.

The computer system 400 can send messages and receive data, including program code, through the network(s), network link and communication interface 418. In the Internet example, a server might transmit a requested code for an application program through the Internet, the ISP, the local network and the communication interface 418. The received code may be executed by processor 404 as it is received, and/or stored in storage device 410, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, FLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 400.

As used herein, the term "or" may be construed in either an inclusive or exclusive sense. Moreover, the description of resources, operations, or structures in the singular shall not be read to exclude the plural, Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although implementations of present subject matter have been described in language specific to structural features and/or methods, it is to be noted that the present subject matter is not necessarily limited to the specific features or methods described. Rather, the specific features and methods are disclosed and explained in the context of a few implementations for the present subject matter.

We claim:

1. A method for renewal of a security certificate of a supplicant device, the method comprising:

receiving, by an authenticator device and from a supplicant device, a request to authenticate the supplicant device based on the security certificate, wherein the request comprises information relating to the security certificate which is expired;

determining, by the authenticator device, a login history of the supplicant device and presence of a valid account associated with the supplicant device in a directory database, wherein the valid account has a login credential and the login history comprises a list of successful login attempts of the supplicant device in a network managed by the authenticator device;

identifying a last successful login attempt from the list of successful login attempts of the supplicant device in the network managed by the authenticator device;

determining whether the last successful login attempt was within a first threshold time period;

sending, by the authenticator device, an authentication successful message to the supplicant device in response to a determination that the last successful login attempt was within the first threshold time period and the valid account associated with the supplicant device is present in the directory database;

redirecting, by the authenticator device, the supplicant device to a captive web portal for authentication of the supplicant device based on the login credential; and providing, by the authenticator device, a renewed security certificate for the supplicant device, in response to successful authentication of the supplicant device in the captive web portal.

2. The method as claimed in claim 1, wherein authentication of the login credential in the captive web portal comprises:
verifying a username and a password of the valid account associated with the supplicant device;
sending a message to an administrator device, wherein the message is indicative of a request for an approval for authentication of the supplicant device; and
in response to receiving the approval from the administrator device, onboarding the supplicant device in a network managed by the authenticator device.

3. The method as claimed in claim 1, further comprising:
determining whether the security certificate has expired within a second threshold time period.

4. The method as claimed in claim 3, wherein the authentication successful message is sent to the supplicant device in further response to a determination that the security certificate has expired within the second threshold time period.

5. The method as claimed in claim 1, wherein providing the renewed security certificate comprises one of:
sending the renewed security certificate to the supplicant device; and
generating a Uniform Resource Locator (URL) for the renewed security certificate to be downloaded by the supplicant device.

6. The method as claimed in claim 1, wherein the security certificate is one of a Transport Layer Security (TLS) certificate and a Secure Sockets Layer (SSL) certificate.

7. The method as claimed in claim 1, wherein the suppliant device is redirected to the captive web portal based on one of a predefined role, a vendor specific attribute, and a redirect URL.

8. An authenticator device comprising:
a processor; and
a memory coupled to the processor, the memory storing instructions executable by the processor to:
receive, from a supplicant device, a request to authenticate the supplicant device based on a security certificate of the supplicant device, wherein the request comprises information relating to the security certificate which is expired;
determine a login history of the supplicant device and presence of a valid account associated with the supplicant device in a directory database, wherein the valid account has a login credential and the login history comprises a list of successful login attempts of the supplicant device in a network managed by the authenticator device;
identify a last successful login attempt from the list of successful login attempts of the supplicant device in the network managed by the authenticator device;
determine whether the last successful login attempt was within a first threshold time period;
send an authentication successful message to the supplicant device in response to a determination that the last successful login attempt was within the first threshold time period and the valid account associated with the supplicant device is present in the directory database;
redirect the supplicant device to a captive web portal for authentication of the supplicant device based on the login credential; and
provide a renewed security certificate for the supplicant device, in response to successful authentication of the supplicant device in the captive web portal.

9. The authenticator device as claimed in claim 8, wherein the processor is further to:
verify a username and a password of the valid account associated with the supplicant device;
send a message to an administrator device, wherein the message is indicative of a request for an approval for authentication of the supplicant device; and
in response to receiving the approval from the administrator device, onboard the supplicant device in a network managed by the authenticator device.

10. The authenticator device as claimed in claim 8, wherein the processor is further to:
determine whether the security certificate has expired within a second threshold time period.

11. The authenticator device as claimed in claim 10, wherein the authentication successful message is sent to the supplicant device in further response to a determination that the security certificate has expired within the second threshold time period.

12. The authenticator device as claimed in claim 8, wherein the processor is further to one of:
send the renewed security certificate to the supplicant device; and
generate a Uniform Resource Locator (URL) for the renewed security certificate to be downloaded by the supplicant device.

13. The authenticator device as claimed in claim 8, wherein the security certificate is one of a Transport Layer Security (TLS) certificate and a Secure Sockets Layer (SSL) certificate.

14. The authenticator device as claimed in claim 8, wherein the suppliant device is redirected to the captive web portal based on one of a predefined role, a vendor specific attribute, and a redirect URL.

15. A non-transitory computer readable medium comprising instructions which, when executed by a processor, causes the processor to:

receive, from a supplicant device, a request to authenticate the supplicant device based on a security certificate of the supplicant device, wherein the request comprises information relating to the security certificate which is expired;

determine a login history of the supplicant device and presence of a valid account associated with the supplicant device in a directory database, wherein the valid account has a login credential and the login history comprises a list of successful login attempts of the supplicant device in a network managed by an authenticator device;

identify a last successful login attempt from the list of successful login attempts of the supplicant device in the network managed by the authenticator device;

determine whether the last successful login attempt was within a first threshold time period;

send an authentication successful message to the supplicant device in response to a determination that the last successful login attempt was within the first threshold time period and the valid account associated with the supplicant device is present in the directory database;

redirect the supplicant device to a captive web portal for authentication of the supplicant device based on the login credential; and provide a renewed security certificate for the supplicant device, in response to successful authentication of the supplicant device in the captive web portal.

16. The non-transitory computer readable medium as claimed in claim 15, the instructions further causing the processor to:

verify a username and a password of the valid account associated with the supplicant device;

send a message to an administrator device, wherein the message is indicative of a request for an approval for authentication of the supplicant device; and in response to receiving the approval from the administrator device, onboard the supplicant device in a network managed by the authenticator device.

17. The non-transitory computer readable medium as claimed in claim 15, the instructions further causing the processor to:

determine whether the security certificate has expired within a second threshold time period.

18. The non-transitory computer-readable medium as claimed in claim 17, wherein the authentication successful message is sent to the supplicant device in further response to a determination that the security certificate has expired within the second threshold time period.

19. The non-transitory computer readable medium as claimed in claim 15, the instructions further causing the processor to:

send the renewed security certificate to the supplicant device; and generate a Uniform Resource Locator (URL) for the renewed security certificate to be downloaded by the supplicant device.

20. The non-transitory computer readable medium as claimed in claim 15, wherein the security certificate is one of a Transport Layer Security (TLS) certificate and a Secure Sockets Layer (SSL) certificate.

* * * * *